(12) United States Patent
Eigner et al.

(10) Patent No.: US 11,292,108 B2
(45) Date of Patent: Apr. 5, 2022

(54) TOOL FOR REMOVING COLLARS

(71) Applicant: United Technologies Corporation, Farmington, CT (US)

(72) Inventors: David J. Eigner, Columbia, CT (US); Steven E. Eichner, Columbia, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 240 days.

(21) Appl. No.: 16/665,395

(22) Filed: Oct. 28, 2019

(65) Prior Publication Data

US 2020/0061781 A1 Feb. 27, 2020

Related U.S. Application Data

(62) Division of application No. 15/026,057, filed as application No. PCT/US2014/060990 on Oct. 17, 2014, now Pat. No. 10,456,894.

(60) Provisional application No. 61/898,501, filed on Nov. 1, 2013.

(51) Int. Cl.
 *B25B 21/00* (2006.01)
 *B23B 31/20* (2006.01)
 *B25B 23/10* (2006.01)

(52) U.S. Cl.
 CPC .......... *B25B 21/002* (2013.01); *B23B 31/204* (2013.01); *B25B 23/105* (2013.01); *B23B 31/201* (2013.01); *B23B 2215/76* (2013.01)

(58) Field of Classification Search
 CPC ... B25B 21/002; B25B 23/105; B23B 31/204; B23B 31/201; B23B 2215/76
 See application file for complete search history.

(56) References Cited

U.S. PATENT DOCUMENTS

| | | | |
|---|---|---|---|
| 1,708,183 A | 4/1929 | Levedahl | |
| 2,797,889 A | 7/1957 | Talboys | |
| 2,836,888 A * | 6/1958 | Hargrove | B23D 29/007 30/272.1 |
| 3,181,580 A | 5/1965 | Taylor | |
| 3,603,132 A | 9/1971 | Holmes | |

(Continued)

FOREIGN PATENT DOCUMENTS

| | | |
|---|---|---|
| KR | 10-2008-0092985 | 10/2008 |
| KR | 10-2013-0095619 | 8/2013 |

OTHER PUBLICATIONS

International Search Report and Written Opinion for International Application No. PCT/US2014/060990 dated Feb. 4, 2015.

(Continued)

*Primary Examiner* — Lee A Holly
(74) *Attorney, Agent, or Firm* — Carlson, Gaskey & Olds, P.C.

(57) ABSTRACT

A method comprises the steps of providing a tool over a collar secured to a stud on a gas turbine engine system. The collet is driven to rotate and remove the collar from the stud. A tool for removing collars from studs has a driver with a housing receiving a piston. A spring drives the piston, and the housing also has a hydraulic fluid supply opening for selectively receiving a hydraulic fluid to move the piston in opposition to a force from the spring. Collet fingers are movable between a released position and a secured position when a supply of hydraulic fluid is supplied into the housing.

15 Claims, 6 Drawing Sheets

(56) References Cited

U.S. PATENT DOCUMENTS

| | | | |
|---|---|---|---|
| 4,249,293 A | | 2/1981 | Schulberg |
| 4,494,412 A | | 1/1985 | Hardy |
| 4,762,030 A | | 8/1988 | Nguyen |
| 4,862,773 A | | 9/1989 | Batten |
| 5,072,785 A | | 12/1991 | Dressler et al. |
| 5,095,779 A | * | 3/1992 | Batten .................. B25B 13/488 81/453 |
| 5,438,891 A | | 8/1995 | Batten |
| 5,598,619 A | * | 2/1997 | Rosier .................. B21J 15/022 29/243.523 |
| 6,134,992 A | | 10/2000 | Perkins |
| 2010/0206140 A1 | | 8/2010 | Lin |
| 2013/0025287 A1 | | 1/2013 | Cunha |

OTHER PUBLICATIONS

International Preliminary Report on Patentability for International Application No. PCT/US2014/060990 dated May 12, 2016.
Singapore Search Report for Singapore Application No. 11201602178Q.
Supplementary European Search Report for European Application No. 14858254.7 completed Nov. 2, 2016.

\* cited by examiner

TOOL FOR REMOVING COLLARS

CROSS-REFERENCE TO RELATED APPLICATION

This application is a divisional of U.S. patent application Ser. No. 15/026,057 filed Mar. 30, 2016, now U.S. Pat. No. 10,456,894 granted on Oct. 29, 2019, which is a National Phase of International Patent Application No. PCT/US2014/060990 filed Oct. 17, 2014, which claims priority to U.S. Provisional Application No. 61/898,501, filed Nov. 1, 2013.

STATEMENT REGARDING FEDERALLY SPONSORED RESEARCH OR DEVELOPMENT

This invention was made with government support under Contract No. F33657-99-D-2051, awarded by the United States Air Force. The Government has certain rights in this invention.

BACKGROUND OF THE INVENTION

This application relates to a method and tool for removing collars from gas turbine engine systems.

Gas turbine engines are known and, typically, include a fan delivering air into a compressor where it is compressed and then delivered into a combustion section. The compressed air is mixed with fuel and ignited in the combustion section and products of this combustion pass downstream over turbine rotors driving them to rotate.

There are many additional systems that may be incorporated into a gas turbine engine. As an example, exhaust liners may be positioned downstream of the turbine section and may include pivoting nozzle members which allow control of the exit of gases from the exhaust.

Systems, such as the liners, may have hundreds of threaded studs holding various components secured together. The studs typically receive a collar which secures the components together.

During maintenance, it is sometimes necessary to remove the collars from the studs to disassemble the system. In the existing art, hand held vice grips are utilized to remove the collars. This is not efficient.

As an example, when such a system is utilized to disassemble a divergent liner for one gas turbine engine, the disassembly alone could require several work days.

SUMMARY OF THE INVENTION

In a featured embodiment, a method comprises the steps of providing a tool over a collar secured to a stud on a gas turbine engine system. The collet is driven to rotate and remove the collar from the stud.

In another embodiment according to the previous embodiment, the collet includes a plurality of collet fingers. The collet fingers are driven between a released and a secured position. The collet fingers are in the released position when initially placed over the collar, and then driven to the locked position prior to the collet fingers being driven to rotate to remove the collar.

In another embodiment according to any of the previous embodiments, the collet fingers move with a piston within a housing. Hydraulic fluid drives the piston to move the collet fingers to the relaxed position at which they define the released position. A spring operates in opposition to the hydraulic fluid to drive the piston and the collet fingers to the secured position.

In another embodiment according to any of the previous embodiments, a single trigger is actuated to supply the hydraulic fluid to drive the piston, then to release the hydraulic fluid to allow the spring to move the piston and then to actuate a motor to drive the collet fingers.

In another embodiment according to any of the previous embodiments, the gas turbine engine system is a portion of an exhaust nozzle.

In another embodiment according to any of the previous embodiments, the portion of the exhaust nozzle is a liner.

In another embodiment according to any of the previous embodiments, the piston has a conical surface which is forced against an edge surface of an opening in the housing. The conical surface is forced against the edge surface to move the collet fingers to the secured position.

In another embodiment according to any of the previous embodiments, the piston has a conical surface which is forced against an edge surface of an opening in the housing. The conical surface is forced against the edge surface to move the collet fingers to the secured position.

In another embodiment according to any of the previous embodiments, the piston has a conical surface which is forced against an edge surface of an opening in the housing. The conical surface is forced against the edge surface to move the collet fingers to the secured position.

In another embodiment according to any of the previous embodiments, the gas turbine engine system is a portion of an exhaust nozzle.

In another embodiment according to any of the previous embodiments, the portion of the exhaust nozzle is a liner.

In another embodiment according to any of the previous embodiments, the piston has a conical surface which is forced against an edge surface of an opening in the housing. The conical surface is forced against the edge surface to move the collet fingers to the secured position.

In another embodiment according to any of the previous embodiments, the gas turbine engine system is a portion of an exhaust nozzle.

In another embodiment according to any of the previous embodiments, the portion of the exhaust nozzle is a liner.

In another embodiment according to any of the previous embodiments, a tool for removing collars from studs comprises a driver having a housing and receiving a piston moveably within the housing. A spring drives the piston. The housing also has a drive for selectively moving the piston in opposition to a force from the spring. Collet fingers are moveable between a released position and a secured position.

In another embodiment according to any of the previous embodiments, the drive includes a hydraulic fluid supply opening for selectively receiving a hydraulic fluid to move the piston in opposition to the force from the spring, and supply of hydraulic fluid controlling the movement of the collet fingers between the released position and the secured position.

In another embodiment according to any of the previous embodiments, the supply of hydraulic fluid drives the piston to the released position and when the hydraulic fluid is released, the spring drives the piston to move the collet fingers to the secured position.

In another embodiment according to any of the previous embodiments, the housing has an opening and there is a conical surface on the piston. The conical surface is forced against edges of the opening in the housing to cam the collet fingers to the secured position.

In another embodiment according to any of the previous embodiments, an electric motor drives a shaft having splines which in turn rotate with the piston, but the piston can move axially relative to the splines.

In another embodiment according to any of the previous embodiments, the collet fingers are separated by slots. The slots are reduced in size when the collet fingers are cammed to the secured position.

These and other features may be best understood from the following drawings and specification.

DETAILED DESCRIPTION

Figure 1A:
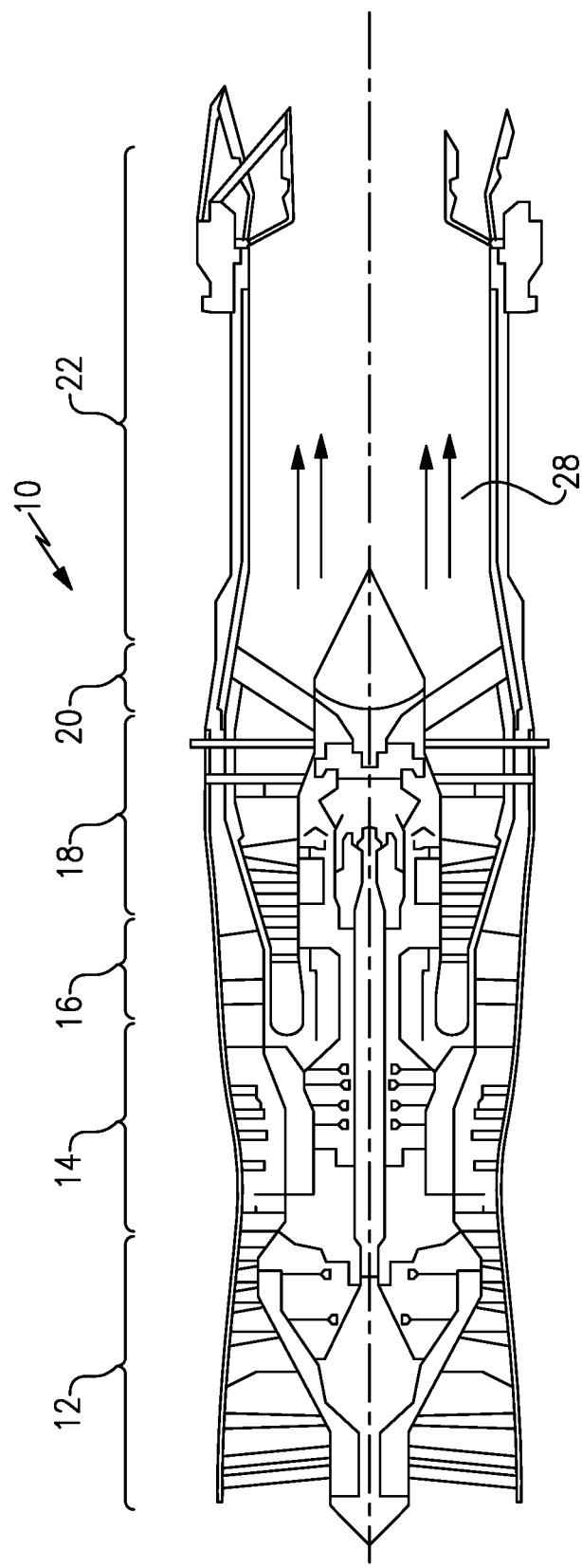
FIG. 1A schematically shows a gas turbine engine.
Figure 1B:
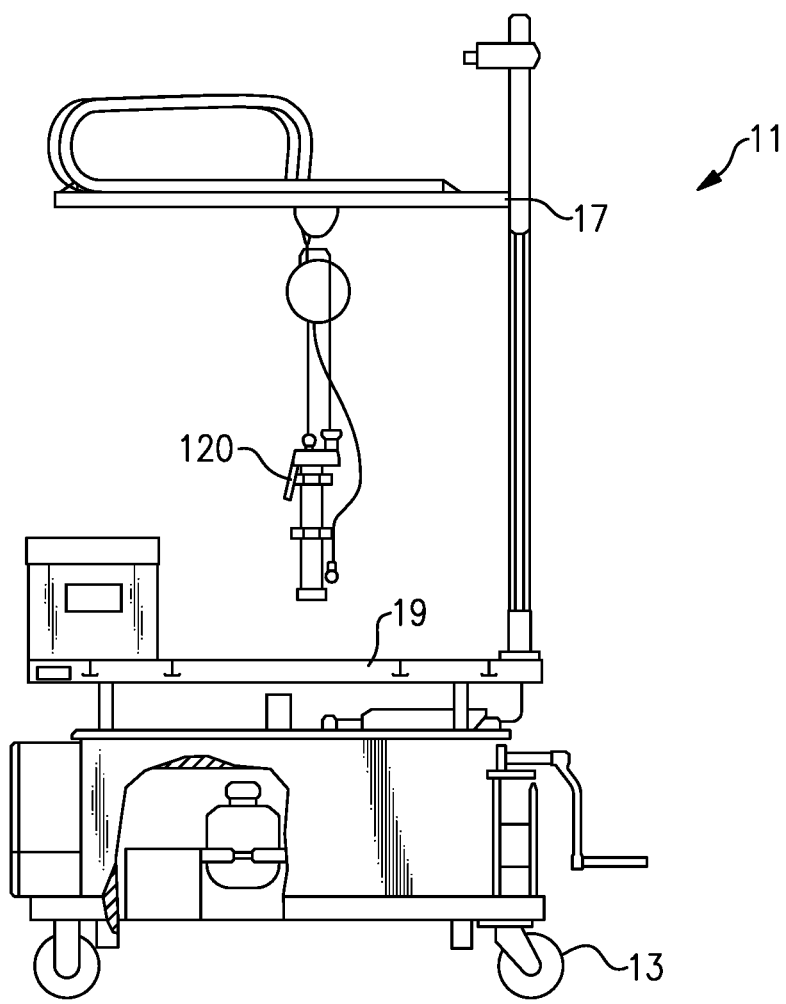
FIG. 1B shows a tool for disassembling systems on the engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22. FIG. 1B shows a tool 11 including a collar driving portion 120 positioned above a base 19, As shown, the tool 11 includes an adjustable frame 17 which can adjust the vertical position of the driver 120. In addition, wheels 13 are provided for making the tool 11 easily transported.

A system, such as a liner, as shown schematically in FIG. 1A, may be placed on the base 19 and the driver 120 may be utilized to disassemble the system for repair.

Figure 1C:
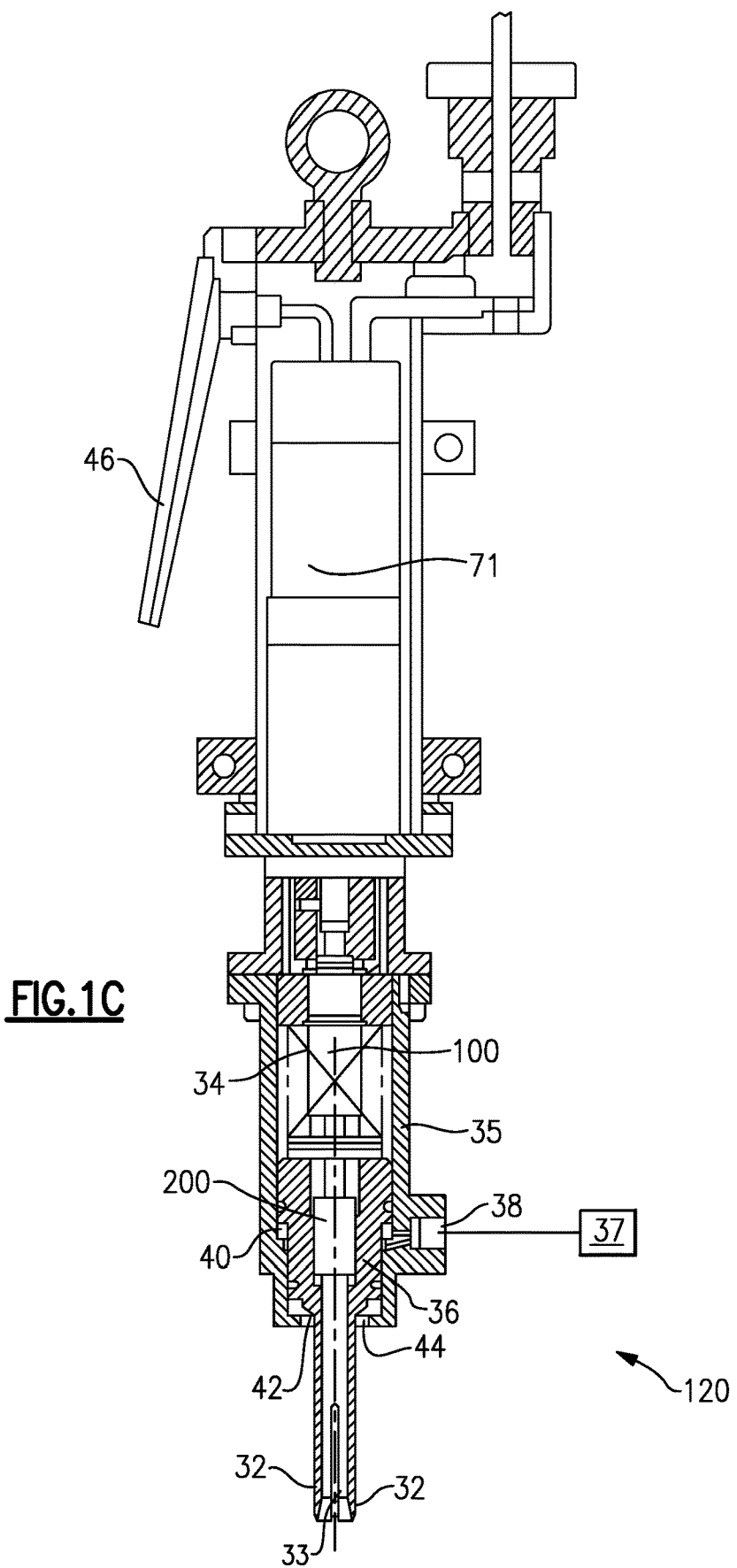
FIG. 1C is a detailed view of that tool.

FIG. 1C shows detail of the driver 120. As shown, collet fingers 32 are spaced by slots 33. The collet moves with a piston 36. A spring 34 normally biases the piston 36 outwardly of a housing 35.

However, when a trigger 46 is actuated hydraulic fluid from a source 37 is delivered through a port 38 into a chamber 40. This moves the piston 36 back into the housing 35 and against the force of the spring 34.

As can be seen, the piston 36 has a conical portion 42 moving within an opening 44 in housing 35.

If the hydraulic fluid is released, then the spring 34 drives the piston 36 back such that the conical surface 42 is forced against edges of the housing opening 44. This cams the fingers 32 together to a driving position as will be explained below. As also shown in FIG. 1C, an electric motor 71 drives a shaft 100 which extends through the spring 34. The shaft 100 rotates with a splined member 200 which will drive the piston 36 to rotate when the motor 71 is actuated to turn. Of course, this will drive the collet fingers 32 to turn. As should be understood, due to the splines, the piston 36 can move axially relative to shaft 100. A housing 35 encloses the operational components as described.

While a hydraulic drive is disclosed, it may be possible to include an electric motor drive in some applications.

Figure 2:
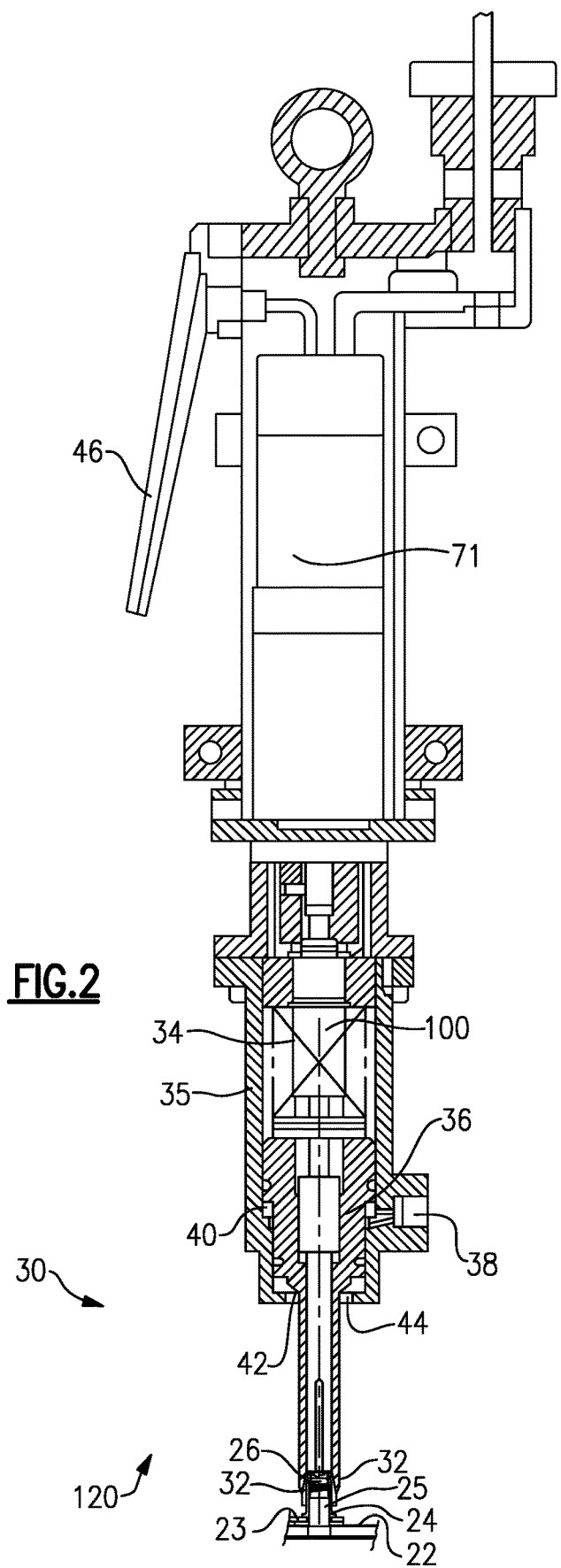
FIG. 2 shows a first step in disassembling a collar from a stud.

As shown in FIG. 2, a liner 22 for a gas turbine engine has studs 25 receiving collars 24 to secure an element 23. Threads 26 are formed on the stud 25. The collet fingers 32 are shown on the collar 24.

To remove the collar 24, the trigger 46 is initially actuated. This allows hydraulic fluid to move into the opening 38 and force the piston 36 back into the housing 35. Thus, the collet fingers 32 are allowed to move away from each other to a relaxed or released position and can fit over the collar 24.

Figure 3:
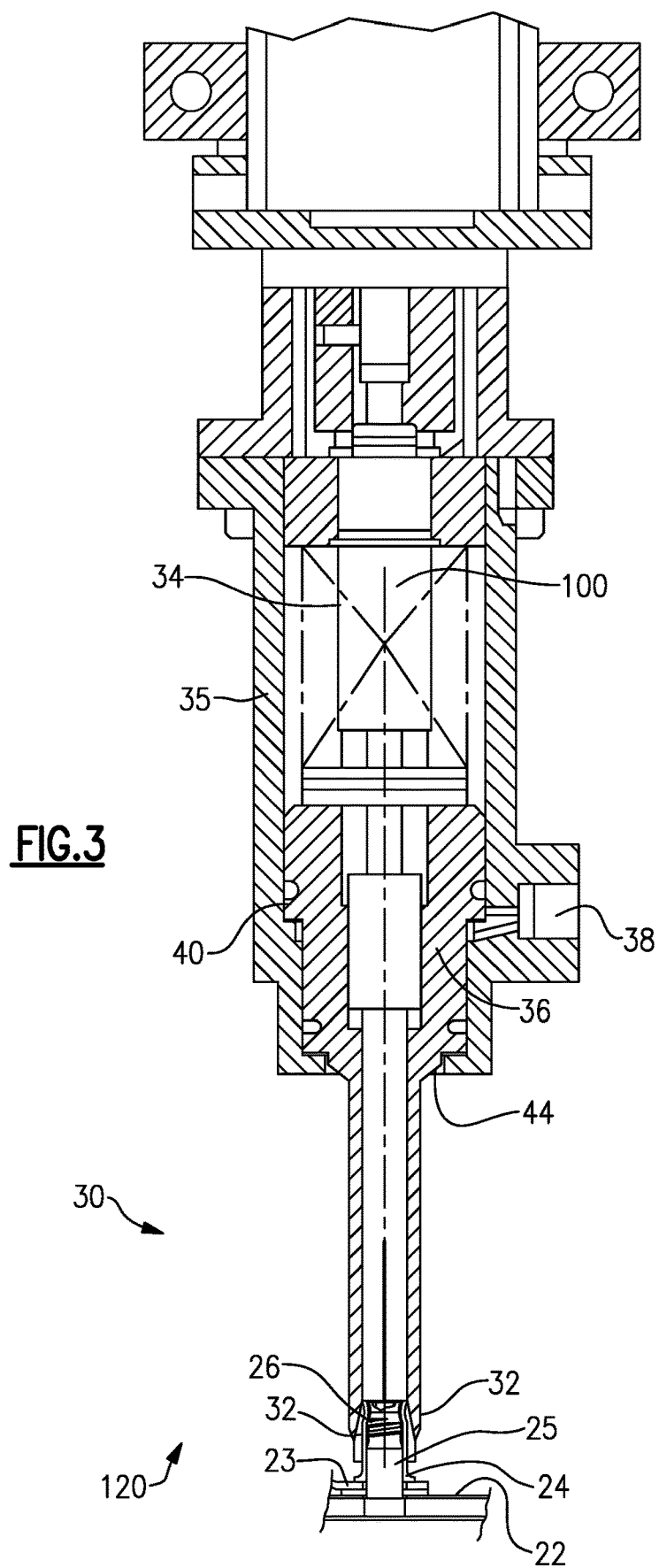
FIG. 3 shows a subsequent step.

As shown in FIG. 3, once the collet fingers 32 are positioned about the collar 24, the hydraulic fluid is released, either automatically or with a subsequent actuation of a switch, such as trigger 46. Once the hydraulic fluid is released, the spring 34 drives the piston 36 outwardly such that the edges of the opening 44 force the conical portion 42 to cam the fingers 32 together and lock on an outer surface of the collar 24. This reduces the size of slots 33, such that fingers 32 are locked.

Figure 4:
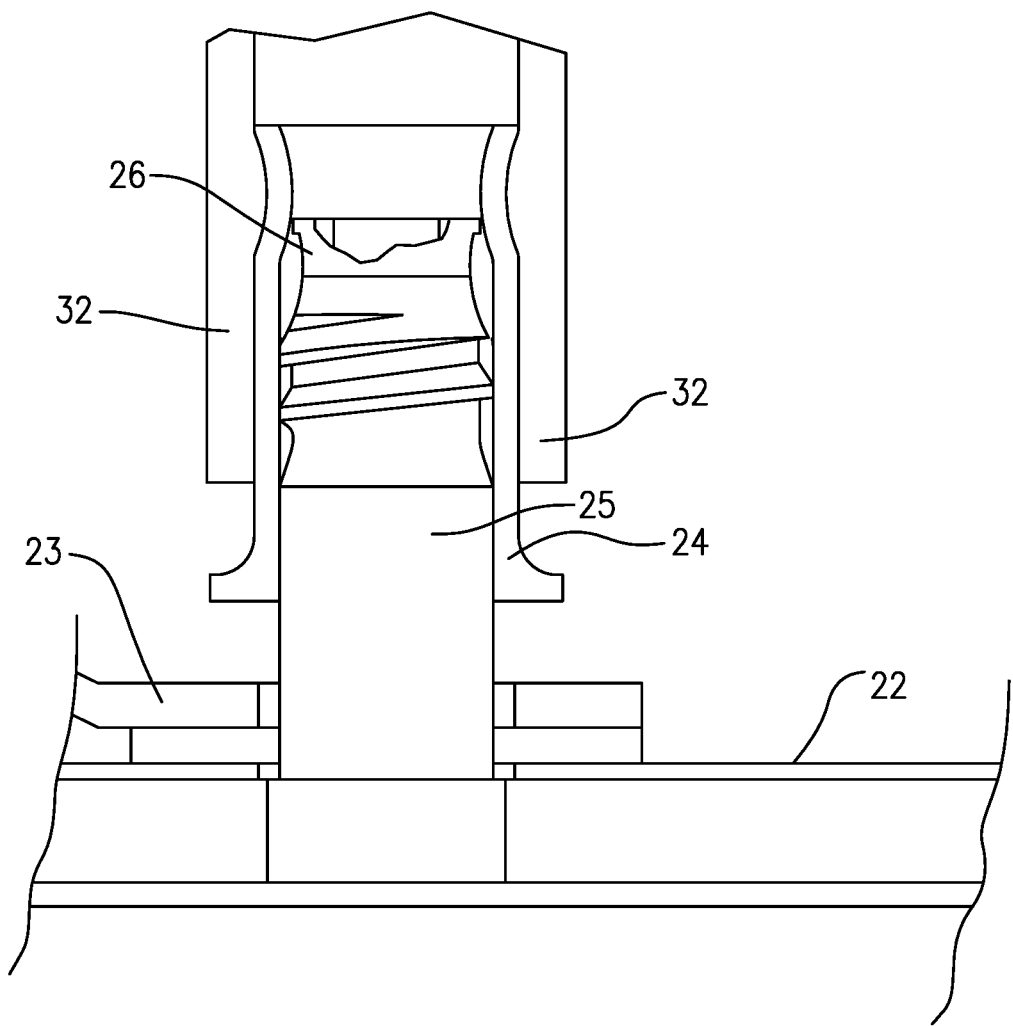
FIG. 4 shows a final step.

Once the collet fingers 32 are locked or in a secured position on the collar 24, an electric motor 71 for driving the piston 36 and, hence, the collet fingers 32 is actuated. When the collet fingers 32 are actuated to turn, they remove the collar 24 as shown in FIG. 4. The actuation of the electric motor 71 may be automatic at a point after the driving of the housing outwardly by the spring or may be actuated by a subsequent switch actuation such as the trigger 46. The torque on the motor can be minimized or reduced by controlling the amount of voltage supplied to the electric motor. In one aspect, a PLC controller controls the voltage supplied to the electric motor.

The present method and tool greatly reduce the challenge of removing the hundreds of collars which may securing together a typical liner for a gas turbine engine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tool for removing collars from studs comprising:
   a driver having a housing and receiving a piston moveably within said housing, a spring driving said piston, said housing also having a drive for selectively moving said piston in opposition to a force from said spring;
   collet fingers being moveable between a released position and a secured position; and
   wherein said housing having an opening and there being a conical surface on said piston, said conical surface being forced against edges of said opening in said housing to cam said collet fingers to said position.

2. The tool for removing collars from studs as set forth in claim 1, wherein said drive includes a hydraulic fluid supply opening for selectively receiving a hydraulic fluid to move said piston in opposition to said force from said spring, and supply of hydraulic fluid controlling the movement of said collet fingers between said released position and said secured position.

3. The tool for removing collars from studs as set forth in claim 2, wherein the supply of hydraulic fluid drives said piston to said released position and when the hydraulic fluid is released, said spring drives said piston to move the collet fingers to the secured position.

4. The tool for removing collars from studs as set forth in claim 3, wherein said hydraulic fluid moving said piston into said housing to the relaxed position, and said spring driving said piston outwardly of said housing to said secured position.

5. The tool for removing collars from studs as set forth in claim 1, wherein an electric motor drives a shaft having splines which in turn rotate with said piston, but wherein said piston can move axially relative to said splines.

6. The tool for removing collars from studs as set forth in claim 5, wherein said collet fingers are separated by slots, and wherein said slots are reduced in size, when said collet fingers are cammed to said secured position.

7. The tool for removing collars from studs as set forth in claim 1, wherein a single trigger is actuated to supply said hydraulic fluid to drive said piston, then to release the hydraulic fluid to allow said spring to move said piston, and then to actuate a motor to drive said collet fingers to rotate.

8. The tool for removing collars from studs as set forth in claim 1, wherein said collet fingers are separated by slots, and wherein said slots are reduced in size, when said collet fingers are cammed to said secured position.

9. A tool for removing collars from studs comprising:
a driver having a housing and receiving a piston moveably within said housing, a spring driving said piston, said housing also having a drive for selectively moving said piston in opposition to a force from said spring; and
collet fingers being moveable between a released position and a secured position;
said drive includes a hydraulic fluid supply opening for selectively receiving a hydraulic fluid to move said piston in opposition to said force from said spring, and supply of hydraulic fluid controlling the movement of said collet fingers between said released position and said secured position;
the supply of hydraulic fluid drives said piston to said released position and when the hydraulic fluid is released, said spring drives said piston to move the collet fingers to the secured position; and wherein a single trigger is actuated to supply said hydraulic fluid to drive said piston, then to release the hydraulic fluid to allow said spring to move said piston, and then to actuate a motor to drive said collet fingers to rotate.

10. The tool for removing collars from studs as set forth in claim 9, wherein said housing having an opening and there being a conical surface on said piston, said conical surface being forced against edges of said opening in said housing to cam said collet fingers to said secured position.

11. The tool for removing collars from studs as set forth in claim 9, wherein an electric motor drives a shaft having splines which in turn rotate with said piston, but wherein said piston can move axially relative to said splines.

12. The tool for removing collars from studs as set forth in claim 9, wherein said collet fingers are separated by slots, and wherein said slots are reduced in size, when said collet fingers are cammed to said secured position.

13. A tool for removing collars from studs comprising:
a collet including a plurality of collet fingers, and said collet fingers being driven between a released and a secured position;
wherein said collet fingers move with a piston within a housing and hydraulic fluid drives said piston to move said collet fingers to the released position, and a spring operating in opposition to said hydraulic fluid to drive said piston and said collet fingers to said secured position, and said hydraulic fluid moving said piston into said housing to the relaxed position, and said spring driving said piston outwardly of said housing to said secured position;
wherein said housing having an opening and there being a conical surface on said piston, said conical surface being forced against edges of said opening in said housing on to cam said collect fingers to said secured position.

14. The tool for removing collars from studs as set forth in claim 13, wherein said collet fingers are separated by slots, and wherein said slots are reduced in size, when said collet fingers are cammed to said secured position.

15. The tool for removing collars from studs as set forth in claim 13, wherein an electric motor drives a shaft having splines which in turn rotate with said piston, but wherein said piston can move axially relative to said splines.

* * * * *